US006973519B1

(12) United States Patent
Estakhri et al.

(10) Patent No.: US 6,973,519 B1
(45) Date of Patent: Dec. 6, 2005

(54) CARD IDENTIFICATION COMPATIBILITY

(75) Inventors: Petro Estakhri, Pleasanton, CA (US); Sam Nemazie, San Jose, CA (US)

(73) Assignee: Lexar Media, Inc., Fremont, CA (US)

( * ) Notice: Subject to any disclaimer, the term of this patent is extended or adjusted under 35 U.S.C. 154(b) by 284 days.

(21) Appl. No.: 10/454,407

(22) Filed: Jun. 3, 2003

(51) Int. Cl.⁷ .............................................. G06F 13/00
(52) U.S. Cl. ........................ 710/104; 710/9; 710/301; 711/115; 235/380
(58) Field of Search ............................... 710/8, 9, 104, 710/301; 711/115; 235/380

(56) References Cited

U.S. PATENT DOCUMENTS

| | | |
|---|---|---|
| 4,099,069 A | 7/1978 | Cricchi et al. |
| 4,130,900 A | 12/1978 | Watanabe |
| 4,309,627 A | 1/1982 | Tabata |
| 4,398,248 A | 8/1983 | Hsia et al. |
| 4,414,627 A | 11/1983 | Nakamura |
| 4,468,730 A | 8/1984 | Dodd et al. |
| 4,473,878 A | 9/1984 | Zolnowsky et al. |
| 4,476,526 A | 10/1984 | Dodd |
| 4,532,590 A | 7/1985 | Wallach et al. |
| 4,609,833 A | 9/1986 | Guterman |
| 4,780,855 A | 10/1988 | Iida et al. |
| 4,788,665 A | 11/1988 | Fukuda et al. |
| 4,797,543 A | 1/1989 | Watanabe |
| 4,829,169 A | 5/1989 | Watanabe |
| 4,843,224 A | 6/1989 | Ohta et al. |
| 4,943,745 A | 7/1990 | Watanabe et al. |
| 4,970,642 A | 11/1990 | Yamamura |
| 4,970,727 A | 11/1990 | Miyawaki et al. |
| 5,093,785 A | 3/1992 | Iijima |
| 5,218,695 A | 6/1993 | Noveck et al. |
| 5,220,518 A | 6/1993 | Haq |
| 5,227,714 A | 7/1993 | Lou |
| 5,253,351 A | 10/1993 | Yamamoto et al. |

(Continued)

FOREIGN PATENT DOCUMENTS

EP        0 392 895 A2    10/1990

(Continued)

OTHER PUBLICATIONS

Mendel Rosenblum and John K. Ousterhout, The Design and implementation of a Log-Structured File System, article, 1991, 15 pgs. Berkeley, USA.

(Continued)

*Primary Examiner*—Son T. Dinh
(74) *Attorney, Agent, or Firm*—Law Offices of Imam

(57) ABSTRACT

An embodiment of the present invention includes a high speed multi-media card system for automatic detection of high speed communication including a host and one or more media cards, coupled to the host through a one or more of data lines, at least one of which is a serial data line. The one or more media cards each have a unique card identification number (CID) associated therewith. In response to a first command from the host requesting each card's unique CID and responsive thereto, said one or more media cards send their respective CID, through the serial data line, to the host and if the sent CID matches that which is expected from the host, the host transmits a second command assigning a relative card address (RCA) to the card whose CID made the match. The one or more media cards drive a predetermined value on all or a portion of the one or more of data lines and the host automatically senses the predetermined value which is indicative of operation at high speeds by the cards which have driven the predetermined value onto the data lines. The host communicates, in high speed mode, with the cards which have driven the predetermined value onto the data lines.

33 Claims, 8 Drawing Sheets

U.S. PATENT DOCUMENTS

| | | |
|---|---|---|
| 5,267,218 A | 11/1993 | Elbert |
| 5,303,198 A | 4/1994 | Adachi et al. |
| 5,305,276 A | 4/1994 | Uenoyama |
| 5,305,278 A | 4/1994 | Inoue |
| 5,315,558 A | 5/1994 | Hag |
| 5,329,491 A | 7/1994 | Brown et al. |
| 5,341,330 A | 8/1994 | Wells et al. |
| 5,341,339 A | 8/1994 | Wells |
| 5,341,341 A | 8/1994 | Fukuzo |
| 5,359,569 A | 10/1994 | Fujita et al. |
| 5,365,127 A | 11/1994 | Manley |
| 5,371,702 A | 12/1994 | Nakai et al. |
| 5,381,539 A | 1/1995 | Yanai et al. |
| 5,382,839 A | 1/1995 | Shinohara |
| 5,384,743 A | 1/1995 | Rouy |
| 5,388,083 A | 2/1995 | Assar et al. |
| 5,404,485 A | 4/1995 | Ban |
| 5,406,527 A | 4/1995 | Honma |
| 5,418,752 A | 5/1995 | Harari et al. |
| 5,422,856 A | 6/1995 | Sasaki et al. |
| 5,430,682 A | 7/1995 | Ishikawa et al. |
| 5,431,330 A | 7/1995 | Wieres |
| 5,465,235 A | 11/1995 | Miyamoto |
| 5,465,338 A | 11/1995 | Clay |
| 5,473,765 A | 12/1995 | Gibbons et al. |
| 5,479,638 A | 12/1995 | Assar et al. |
| 5,490,117 A | 2/1996 | Oda et al. |
| 5,513,138 A | 4/1996 | Manabe et al. |
| 5,515,333 A | 5/1996 | Fujita et al. |
| 5,519,847 A | 5/1996 | Fandrich et al. |
| 5,523,980 A | 6/1996 | Sakui et al. |
| 5,524,230 A | 6/1996 | Sakue et al. |
| 5,530,673 A | 6/1996 | Tobita et al. |
| 5,530,828 A | 6/1996 | Kaki et al. |
| 5,530,938 A | 6/1996 | Akasaka et al. |
| 5,541,551 A | 7/1996 | Brehner et al. |
| 5,544,356 A | 8/1996 | Robinson et al. |
| 5,552,698 A | 9/1996 | Tai et al. |
| 5,572,466 A | 11/1996 | Sukegawa |
| 5,579,502 A | 11/1996 | Konishi et al. |
| 5,581,723 A | 12/1996 | Hasbun |
| 5,592,415 A | 1/1997 | Kato et al. |
| 5,598,370 A | 1/1997 | Niijima et al. |
| 5,602,987 A | 2/1997 | Harari et al. |
| 5,603,001 A | 2/1997 | Sukegawa et al. |
| 5,611,067 A | 3/1997 | Okamoto et al. |
| 5,640,528 A | 6/1997 | Harney et al. |
| 5,648,929 A | 7/1997 | Miyamoto |
| 5,723,990 A | 3/1998 | Roohparvar |
| 5,734,567 A | 3/1998 | Griffiths et al. |
| 5,745,418 A | 4/1998 | Ma et al. |
| 5,754,567 A | 5/1998 | Norman |
| 5,757,712 A | 5/1998 | Nagel et al. |
| 5,758,100 A | 5/1998 | Odisho |
| 5,761,117 A | 6/1998 | Uchino et al. |
| 5,768,190 A | 6/1998 | Tanaka et al. |
| 5,768,195 A | 6/1998 | Nakamura et al. |
| 5,773,901 A | 6/1998 | Kantner |
| 5,781,478 A | 7/1998 | Takeuchi et al. |
| 5,787,445 A | 7/1998 | Daberko |
| 5,787,484 A | 7/1998 | Norman |
| RE35,881 E | 8/1998 | Barrett et al. |
| 5,799,168 A | 8/1998 | Ban |
| 5,802,551 A | 9/1998 | Komatsu et al. |
| 5,809,515 A | 9/1998 | Kaki et al. |
| 5,809,558 A | 9/1998 | Matthews et al. |
| 5,809,560 A | 9/1998 | Schneider |
| 5,818,781 A | 10/1998 | Estakhri et al. |
| 5,822,245 A | 10/1998 | Gupta et al. |
| 5,822,252 A | 10/1998 | Lee et al. |
| 5,822,781 A | 10/1998 | Wells et al. |
| 5,831,929 A | 11/1998 | Manning |
| 5,835,935 A | 11/1998 | Estakhri et al. |
| 5,845,313 A | 12/1998 | Estakhri et al. |
| 5,847,552 A | 12/1998 | Brown |
| 5,860,083 A | 1/1999 | Sukegawa |
| 5,860,124 A | 1/1999 | Matthews et al. |
| 5,862,099 A | 1/1999 | Gannage et al. |
| 5,890,192 A | 3/1999 | Lee et al. |
| 5,901,086 A | 5/1999 | Wang et al. |
| 5,907,856 A | 5/1999 | Estakhri et al. |
| 5,909,586 A | 6/1999 | Anderson |
| 5,920,884 A | 7/1999 | Jennings, III et al. |
| 5,928,370 A | 7/1999 | Asnaashari |
| 5,930,815 A | 7/1999 | Estakhri et al. |
| 5,933,368 A | 8/1999 | Ma et al. |
| 5,933,846 A | 8/1999 | Endo |
| 5,936,971 A | 8/1999 | Harari et al. |
| 5,937,425 A | 8/1999 | Ban |
| 5,953,737 A | 9/1999 | Estakhri et al. |
| 5,956,473 A | 9/1999 | Ma et al. |
| 5,959,926 A | 9/1999 | Jones et al. |
| 5,966,727 A | 10/1999 | Nishino |
| 5,986,933 A | 11/1999 | Takeuchi et al. |
| 5,987,563 A | 11/1999 | Itoh et al. |
| 5,987,573 A | 11/1999 | Hiraka |
| 6,011,322 A | 1/2000 | Stumfall et al. |
| 6,011,323 A | 1/2000 | Camp |
| 6,021,408 A | 2/2000 | Ledain et al. |
| 6,026,020 A | 2/2000 | Matsubara et al. |
| 6,026,027 A | 2/2000 | Terrell, II et al. |
| 6,034,897 A | 3/2000 | Estakhri et al. |
| 6,035,357 A | 3/2000 | Sakaki |
| 6,040,997 A | 3/2000 | Estakhri |
| 6,047,352 A | 4/2000 | Lakhani et al. |
| 6,055,184 A | 4/2000 | Acharya et al. |
| 6,055,188 A | 4/2000 | Takeuchi et al. |
| 6,072,796 A | 6/2000 | Christensen et al. |
| 6,081,447 A | 6/2000 | Lofgren et al. |
| 6,081,878 A | 6/2000 | Estakhri et al. |
| 6,097,666 A | 8/2000 | Sakui et al. |
| 6,115,785 A | 9/2000 | Estakhri et al. |
| 6,125,424 A | 9/2000 | Komatsu et al. |
| 6,125,435 A | 9/2000 | Estakhri et al. |
| 6,128,695 A | 10/2000 | Estakhri et al. |
| 6,134,145 A | 10/2000 | Wong |
| 6,134,151 A | 10/2000 | Estakhri et al. |
| 6,141,249 A | 10/2000 | Estakhri et al. |
| 6,145,051 A | 11/2000 | Estakhri et al. |
| 6,151,247 A | 11/2000 | Estakhri et al. |
| 6,173,362 B1 | 1/2001 | Yoda |
| 6,181,118 B1 | 1/2001 | Meehan et al. |
| 6,182,162 B1 | 1/2001 | Estakhri et al. |
| 6,226,708 B1 | 5/2001 | McGoldrick et al. |
| 6,230,234 B1 | 5/2001 | Estakhri et al. |
| 6,262,918 B1 | 7/2001 | Estakhri et al. |
| 6,272,610 B1 | 8/2001 | Katayama et al. |
| 6,279,069 B1 | 8/2001 | Robinson et al. |
| 6,279,114 B1 | 8/2001 | Toombs et al. |
| 6,374,337 B1 | 4/2002 | Estakhri |
| 6,393,513 B2 | 5/2002 | Estakhri et al. |
| 6,820,148 B1 * | 11/2004 | Cedar et al. ................ 710/104 |
| 2002/0144173 A1 | 10/2002 | Jeddeloh |
| 2003/0033471 A1 | 2/2003 | Lin et al. |

FOREIGN PATENT DOCUMENTS

| | | |
|---|---|---|
| EP | 0 522 780 A2 | 1/1993 |
| EP | 0 522 780 B1 | 1/1993 |
| EP | 0 613 151 A2 | 8/1994 |
| EP | 0 617 363 A2 | 9/1994 |
| EP | 0 619 541 A2 | 10/1994 |
| EP | 0 663 636 A1 | 7/1995 |
| GB | 2 251 323 | 7/1992 |

| | | |
|---|---|---|
| GB | 2 291 990 | 2/1996 |
| GB | 2 304 428 | 3/1997 |
| JP | 3-228377 | 10/1981 |
| JP | 59-92483 | 5/1984 |
| JP | 1-138694 | 5/1989 |
| JP | 4-57295 | 2/1992 |
| JP | 4-254994 | 9/1992 |
| JP | 4-268284 | 9/1992 |
| JP | 4-278297 | 10/1992 |
| JP | 5-128877 | 5/1993 |
| JP | 5-282883 | 10/1993 |
| JP | 6-4399 | 1/1994 |
| JP | 6-36578 | 2/1994 |
| JP | 6-124175 | 5/1994 |
| JP | 6-124231 | 5/1994 |
| JP | 6-131889 | 5/1994 |
| JP | 6-132747 | 5/1994 |
| JP | 6-149395 | 5/1994 |
| JP | 6-266596 | 9/1994 |
| JP | 7-84871 | 3/1995 |
| JP | 7-93499 | 4/1995 |
| JP | 7-114499 | 5/1995 |
| JP | 7-141258 | 6/1995 |
| JP | 7-235193 | 9/1995 |
| JP | 7-311708 | 11/1995 |
| JP | 7-334996 | 12/1995 |
| JP | 8-18018 | 1/1996 |
| JP | RM-37697 | 2/1996 |
| JP | 8-69696 | 3/1996 |
| JP | 9-147581 | 6/1997 |
| SU | 1388877 A1 | 4/1988 |
| SU | 1408439 A1 | 7/1988 |
| SU | 1515164 A1 | 10/1989 |
| SU | 1541619 A1 | 2/1990 |
| SU | 1573458 A2 | 6/1990 |
| SU | 1686449 A2 | 10/1991 |
| WO | WO 94/20906 | 9/1994 |
| WO | WO 02/15020 A2 | 2/2002 |

OTHER PUBLICATIONS

Brian Dipert and Markus Levy, Designing with Flash Memory, book, Apr. 1994, 445 pgs., Anne books, San Diego, USA.

Science Forum, Inc., Flash Memory Symposium '95, symposium, 1995, 13 pgs.; Hongo,Bunkyo-ku, Tokyo.

Ross S. Finlayson and David R. Cheriton, An Extended File Service Exploiting Write-Once Storage, article, 1987, 10 pgs. ACM.

Jason Gait, The Optical File Cabinet: A Random-Access File System for Write-Once Optical Disks, article, Jun. 1988, 12 pgs., Beaverton, Oregon.

Henry G. Baker, Memory Management, book, 1995, 19 pgs., Springer-Verlag Berlin Heidelberg, Germany.

Sape J. Mullender and Andrew S. Tanenbauum, A Distributed File Service Based on Optimistic Concurrency Control, article, 1985, 12 pgs., ACM.

Hiroshi Nakamura, Junichi Miyamoto, Kenichi Imamiya and Yoshihisa Iwata, A Novel Sense Amplifier for Flexible Voltage Operation NAND Flash Memories, symposium, 1995, VLSI Circuits Digest of Technical Papers., 2 pgs.

Hiroshi Nakamura, Junichi Miyamoto, Kenichi Imamiya, Yoshihisa Iwata, Yoshihisa Sugiura and Hideko Oodaira, A Novel Sensing Scheme with On-Chip Page Copy for Flexible Voltage NAND Flash Memories, article, Jun. 1996, 9 pgs.., vol. E79-C, No. 6.

Takaaki Nozaki, Toshiaki Tanaka, Yoshiro Kijiya, Eita Kinoshita, Tatsuo Tsuchiya and Yutaka Hayashi, A 1-Mb EEPROM with MONOS Memory Cell for Semiconductor Disk Application, article, 1991, 5 pgs., Journal Of Solid-State Circuits, vol., 26, No. 4.

Kai Hwang and Faye A. Briggs, Computer Architecture and Parallel Processing, book, 1984, McGraw-Hill, Inc., 2 pgs., US.

Walter Lahti and Dean McCarron, State of the Art: Magnetic Vs. Optical Store Data in a Flash, article, 1990, 7 pgs., vol. 15, No. 12, McGraw-Hill, Inc., US.

Ron Wilson, Integrated Circuits: 1-Mbit flash memories seek their role in system design, article, Mar. 1, 1989, 2 pgs., No. 6, Tulsa, OK.

S. Mehroura, J.H. Yuan, R.A. Cemea, W.Y. Chien, D.C. Guteman, G. Samachisa, R.D. Noman, M. Mofidi, W.Lee, Y. Fong, A. Mihnea, E. Hann, R.W. Gregor, E.P. Eberhardt, J.R. Radosevich, K.R. Stiles, R.A. Kohler, C.W. Leung, and T.J. Mulrooney, Serial 9Mb F EEPROM for Solid State Disk Applications, symposium, 1992, 2 pgs., Mountain View, CA.

Steven H. Leibson, Nonvolatile, in-circuit-reprogrammable memories, article, Jan. 3, 1991, 12 pp., EDN, Circle No. 12.

Walter Lahti and Dean McCarron, State of the Art: Magnetic VS. Optical Store Data in a Flash, article, 1990, 7 pgs., vol. 15, No. 12, McGraw-Hill, Inc., US.

Kai Hwang and Faye A. Briggs, Computer Architecture and Parallel Processing, book, 1984, McGraw-Hill, Inc., 2 pgs., US.

Steven H. Leibson, Nonvolatile, in-circuit-reprogrammable memories, article, Jan. 3, 1991, 12 pgs., EDN, Circle No. 12.

Ramon Caceres, Fred Douglis, Kai Li and Brian Marsh, Operationg System Implications of Solid-State Mobile Computers, article, 7 pgs., Oct. 1993, Workshop on Workstation Operting Systems.

Michael Wu and Wily Zwaenepoel, A Non-Volatile, Main Memory Storage System, 12 pgs., 1994, ACM, San Jose, CA USA.

Dave Bursky, Innovative flash memories match DRAM densities: available with a choice of features, flash memories are finding homes in many systems (includes related articles on the origins of flash, and on the differences between NAND and NOR flash memories), article, May 16, 1994, 9 pgs., Electronic Design, v.42,n.10. The Gate Group.

Anthony Cataldo, New flash enhancements up ante. (Intel's 28F400BV-120 and 28F004BV-120, Atmel's AT29BV010 and AT29BV020, and Samsung Semiconductor's KM29V32000 ★flash★ memory★ devices)(Product Announcement), article, Mar. 13, 1995, 4 pgs., Electronic News, v.41, n.2056, The Gale Group.

Sam Weber, ★Flash★ modules' portability, reusability, small size valued for a host of APPs-Consumer formats flocking to ★flash★ , article, Jul. 22, 1996, 9 pgs., Electronic Engineering Times, n.911, CMP Media.

Toshiba, MOS Memory (Non-Volatile), 1995, Data Book.

Stan Baker, But Integration Calls For Hardware, Software Changes: Flash: designers face the dawn of a new memory age, article, Sep. 12, 2003, 5 pgs., Electronic Engineering Times, 1990, N.619, 41, CMP Media.

Toshiba, Toshiba MOS Digital Integrated Circuit Silicon Gate CMOS, (TC58NS512DC) Mar. 21, 2001, 43 pgs., Data Book.

Toshiba Corporation, SMIL (Smartmedia Interface Library) Hardware Edition Version 1.00, Jul. 1, 2000, 36 pgs, Data Book.

Toshiba, Toshiba MOS Digital Integrated Circuit Silicon Gate, (TC58512FT), Mar. 5, 2001, 43 pgs, Data Book.

Toshiba, Toshiba MOS Digital Integrated Circuit Silicon Gate, (TC58DVM92A1FT00). Jan. 10, 2003, 44 pgs., Data Book.

Toshiba, Toshiba MOS Digital Integrated Circuit Silicon Gate, (TC58DVG02A1FT00). Jan. 10, 2003, 44 pgs., Data Book.

Toshiba, Toshiba MOS Digital Integrated Circuit Silicon Gate, (TH58100FT), Mar. 5, 2001, 43 pgs., Data Book.

35Nonvolatile Memory Technology Review, A Time of Change, Proceedings 1993 Conference, Jun. 22-24, 1993, Linthicum Heights, MD USA.

Toshiba Corporation, SMIL (Smartmedia Interface Library) Software Edition Version 1.00, Jul. 1, 2000, 136 pgs., Data Book.

Toshiba, MOS Memory (Non-Volatile), 1996, 279 pgs., Data Book.

Dan Auclair, Optimal Solid State Disk Architecure For Portable Computers, symposium, Jul. 8, 1991, 7 pgs., SunDisk Corporation.

Sandisk, SD Card Specification *Simplified Version of:* Part E1 Secure Digital Input/Output (SDIO) Card Specification, Publication, Oct. 2001, 15 pgs., Version 1.00, SD Association.

Sandisk, SD Memory Card Specifications *Simplified Version of:* Part 1 Physical Layer Specification, Publication, Apr. 15, 2001, 16 pgs., Version 1.01, SD Group.

MMCA Technical Committee, The Multimedia Card Publication, Mar. 2003, 19 pgs., Based on Systems Specification Version 3.31,MMCA.

* cited by examiner

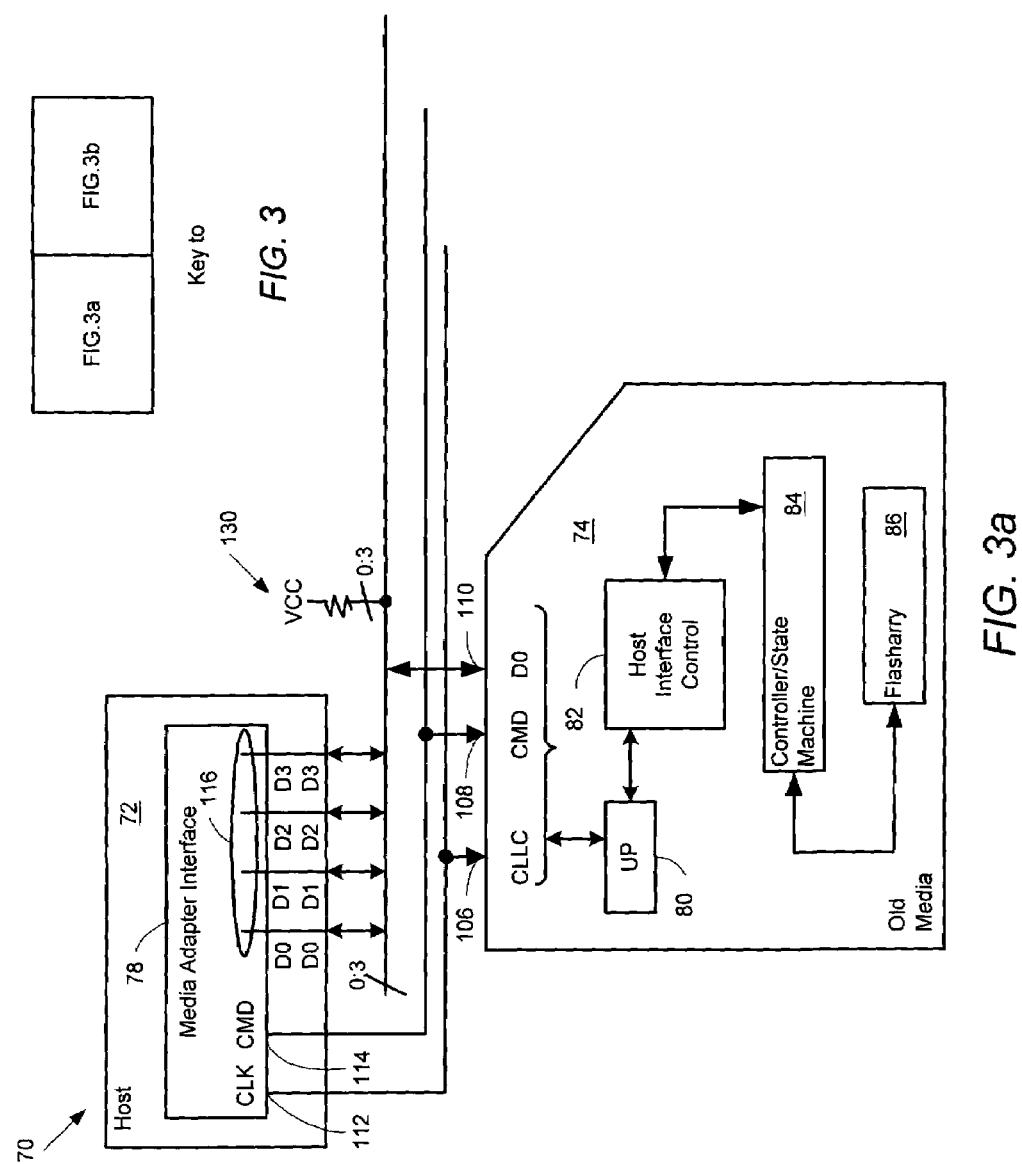

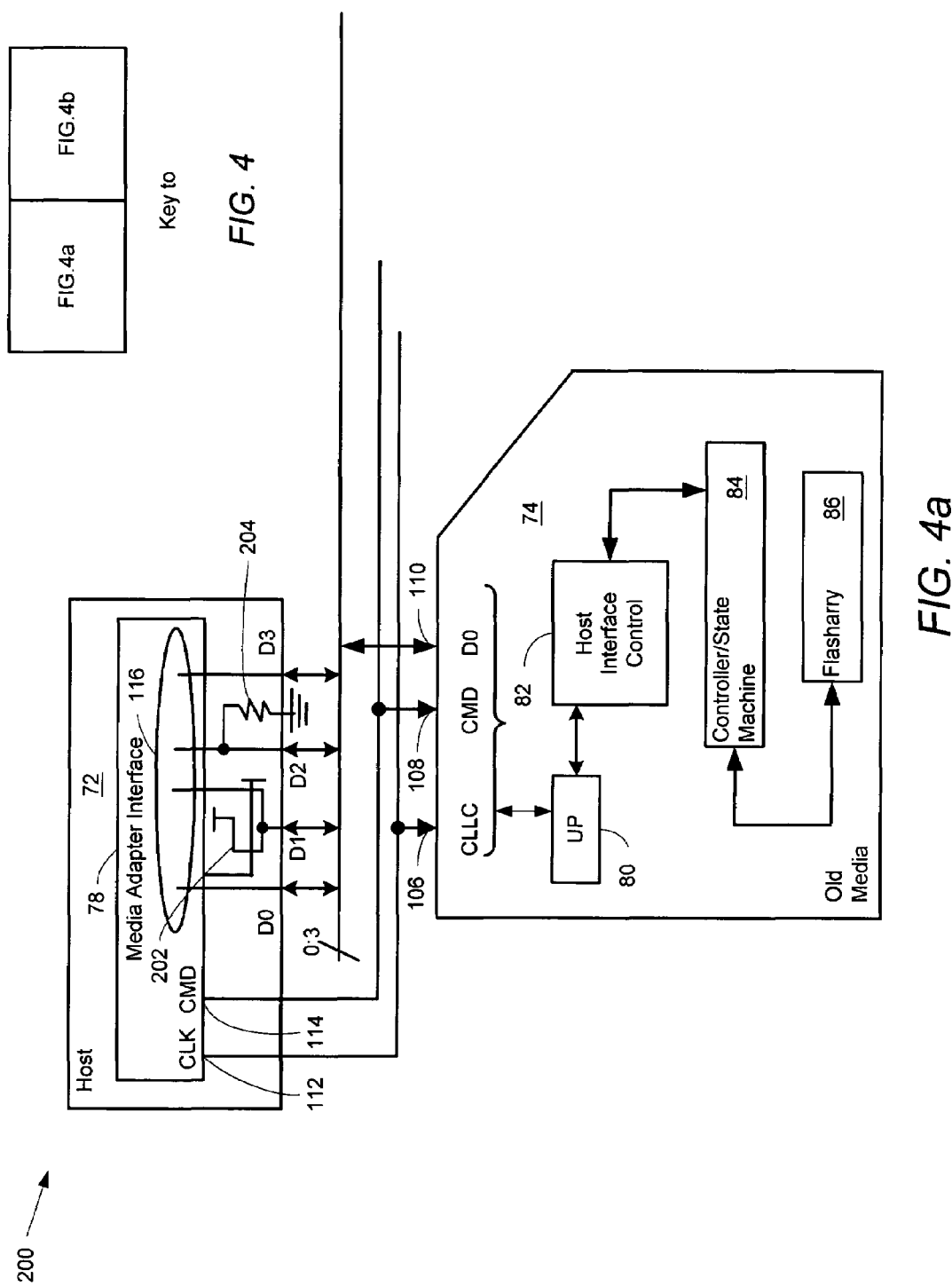

CARD IDENTIFICATION COMPATIBILITY

BACKGROUND OF THE INVENTION

1. Field of the Invention

The present invention relates generally to a fast method and apparatus for identification of media cards and particularly to increasing the speed of identifying such media cards used in multi-media card (MMC) or universal serial bus (USB) applications employing nonvolatile memory.

2. Description of the Prior Art

In current multi-media card (MMC) systems, a host communicates with one or more media cards, connected thereto, in various ways depending upon the requirement for the number of data bits being employed. FIGS. 1 and 2 show two separate examples, respectively, of such prior art MMC systems.

In FIG. 1, a MMC system 10 is shown to include a host 12 coupled to two media cards, 14 and 16. While only two media cards are shown coupled to the host 12, any number of cards may be similarly connected. The media cards are storage media cards, such as digital film cards, or any other type of electronic storage media.

The host 12 is shown to include a data port 18, a clock port 20 and a command port 22, which are coupled to a serial data input/output (SDIO) port 24 of the media card 14, a clock port 26 of the media card 14 and a command port 28 of the media card 14, respectively. The host 12 is also in communication, through its data port 18, clock port 20 and command port 22, with the media card 16. That is, data port 18 is connected to a SDIO port 30 of the media card 16 and the clock port 20 is connected to the clock port 32 of the media card 16 and the command port 22 is connected to the command port 34 of the media card 16.

The data port 18, the SDIO port 24 and the SDIO port 30 are each single-bit ports, thus, one bit of data is transferred between the host 12 and the media cards 14 and 16 at any given time. This is commonly referred to as a serial-bit transfer. The host issues a command, through the command port 22 to the command port 28 or 34 depending on which media card is being addressed, and then transfers any data associated with the specific command issued by the host, through the data port 18, serially. The clock port 20, in communication with the ports 26 and 32, is used to synchronize data and perhaps even command information issued between the host and the media cards 14 and 16 so that such information can be accurately transferred therebetween.

The problem with the system 10 is its limited data transfer rate between the cards 14 and 16 and the host 12 due to the one-bit data transfer limitation.

In FIG. 2, there is shown an example of another prior art system. A MMC system 40 is shown to include a host 42 coupled to an old media card 44 and a new media card 46 through the host's data port 48, clock port 50 and command port 52 to various ports on the cards 44 and 46, as will be described in further detail below. The old media card 44 is similar to that of media cards 14 and 16 of FIG. 1 and thus referred to as "old" since the prior art system of FIG. 2 is an improvement of the prior art system of FIG. 1 in a manner that will be indicated shortly. The new media card 46 is referred to as "new" because its operation is somewhat different than that of the card 44.

The data port 48 is coupled to a SDIO port 54 of the card 44 as well as to a DIO port 60 of the card 46. Similarly, the clock port 50 is coupled to a clock port 56 of the card 44 and a clock port 62 of the card 46. The command port 52 is shown coupled to a command port 58 of the card 44 and a command port 64 of the card 46.

The operation between the host 42 and the card 44 is similar to that of the operation between the host 12 and the cards 14 and 16 of FIG. 1. In FIG. 2, data is transferred between the data port 48 of the host 42 and the SDIO port 54 of the card 44 in a serial fashion.

Communication between the host 42 and the card 46 is however, different in that the data port 60 can receive or transmit data either in a one-bit or serial fashion or in a 4-bit fashion, or in parallel. Through the command port 64, the media card 46 informs the host 42 that it is able to receive data four bits at a time or if it desires, one bit at a time and the host thereafter responds accordingly. In fact, the card 44 also, through a command of its own, communicated between the ports 58 and 52, can inform the host of its data transfer capability, in this case, however, that being a one-bit or serial transfer at all times. That is, the card 44 does not have the luxury of switching between a one-bit and a four-bit data transfer, whereas, the card 46 does have such a capability and the latter does so through communication between the host 42 and the card 46. The clock port 50, in concert with the clock ports 56 and 62, acts to synchronize data, as discussed with reference to FIG. 1.

In operation, the host 42, through its command port 52, requests, from each of the cards 44 and 46, the number of data lines it can support. Once this is established by the host 42, it sends another command, through its port 52, indicating switching to the new number of data lines. The system 40 of FIG. 2 is employed by many standard bodies in the industry, such as the Personal Computer Memory Card International Association (PCMCIA) where the host reads an attribute register at an offset address of 0D2 (in hexadecimal notation) to determine if the card supports 8 bits or 16 bits. The host then sets a bit in the configuration register to set the media card to 8 bits only, as an example.

The advantage of the prior art system shown in FIG. 2 over the prior art system shown in FIG. 1 is two-fold. First, obviously, a higher data rate transfer is achieved using four-bit data transfers. It should be clear to one of ordinary skill in the art that to increase performance, parallel processing need be done. Second, while the card 46 is a new media card, i.e. capable of transferring data either in one or four bit format, it can be placed in the same type of card slot as that of the old media card 44, the latter of which cannot transfer data in a four bit format. Additionally, numerous cards, beyond that of the two media cards shown in FIG. 2 can be employed in the system 40 in any combination of the old media card and the new media card.

The problem with the prior art system of FIG. 2 is that the host has to first send a command requesting the number of data lines that can be supported and then has to send another command asking for the switch to a different number of data lines, if so decided. This is particularly cumbersome when there are a large number of media cards, as it increases the housekeeping or initialization chores and slows the operation of the system.

In FIG. 2(a), yet another prior art system 41 is shown to include a host 51, which includes a host controller 53 coupled to a mux 65. Through the mux 65 and the controller 53, the host 51 is coupled to the sockets 53, 55 and 57, which can be any number of sockets. The latter sockets are for receiving media cards employed for the electronic storage of data. The cards (not shown) that can be inserted into the sockets include a relative card address (RCA) register for identifying each card to the host. These addresses are each unique to an individual card and may be chosen by the card or by the host depending on the set-up being utilized.

Data transfer between the host controller 53 and the cards inserted into the sockets 53–57 can be serial (one-bit) or 4 or 8 bit transfers (multiple bits) for each card within the sockets. An example of a 4-bit data transfer for the system 41 is shown in FIG. 2(b). In multiple bit transfers, a mux 105 is coupled between the host controller 53 and to four switching logic circuits, 11, 111, 113 and 115, to which four data lines, DAT 0–3 are provided from the host controller 53 through the mux 105. The switching logic circuits are coupled to sockets 1–n, 117–121. The sockets have media cards inserted therein, as explained relative to FIG. 2(a).

The steps executed by the system 41 cause a unique relative address to be written into the RCA register of each card that is inserted into the sockets of the system 41. First, the contents of the RCA register of the cards plugged into the sockets 117, 119 and 121 is read by the host controller 53. The contents of the register of each card includes information regarding what type of transfer the card can support, i.e. 1 bit or serial or 4 bits or 8 bits. Once the contents of the RCA register is read, a bit in the card is set by the host controller 53 to enable the number of data lines supported by the card. In the example of FIG. 2(b), this would be a 4-bit data transfer, thus, a bit is set to indicate a 4-bit transfer. Thus, two events must occur in order to prepare for data transfers. First, the RCA register is read to ensure that, for example, a four-bit data transfer is supported by the card and second, a bit is set, in the card, to enable the card to operate in four bit mode.

Thus, the need arises for a high-speed MMC system and method including one or more MMC for switching between different number of data lines for each MMC coupled to a host such that a minimum number of commands need be transferred between the MMCs and the host while allowing for switching between any number of data lines for as many MMCs as needed thereby increasing system throughput by reducing delay.

SUMMARY OF THE INVENTION

Briefly, an embodiment of the present invention includes a high speed multi-media card system for automatic detection of high speed communication including a host and one or more media cards, coupled to the host through a one or more of data lines, at least one of which is a serial data line. The one or more media cards each have a unique card identification number (CID) associated therewith. In response to a first command from the host requesting each card's unique CID and responsive thereto, said one or more media cards send their respective CID, through the serial data line, to the host and if the sent CID matches that which is expected from the host, the host transmits a second command assigning a relative card address (RCA) to the card whose CID made the match. The one or more media cards drive a predetermined value on all or a portion of the one or more of data lines and the host automatically senses the predetermined value which is indicative of operation at high speeds by the cards which have driven the predetermined value onto the data lines. The host communicates, in high speed mode, with the cards which have driven the predetermined value onto the data lines.

The foregoing and other objects, features and advantages of the present invention will be apparent from the following detailed description of the preferred embodiments which make reference to several figures of the drawing.

IN THE DRAWINGS

Figure 1:
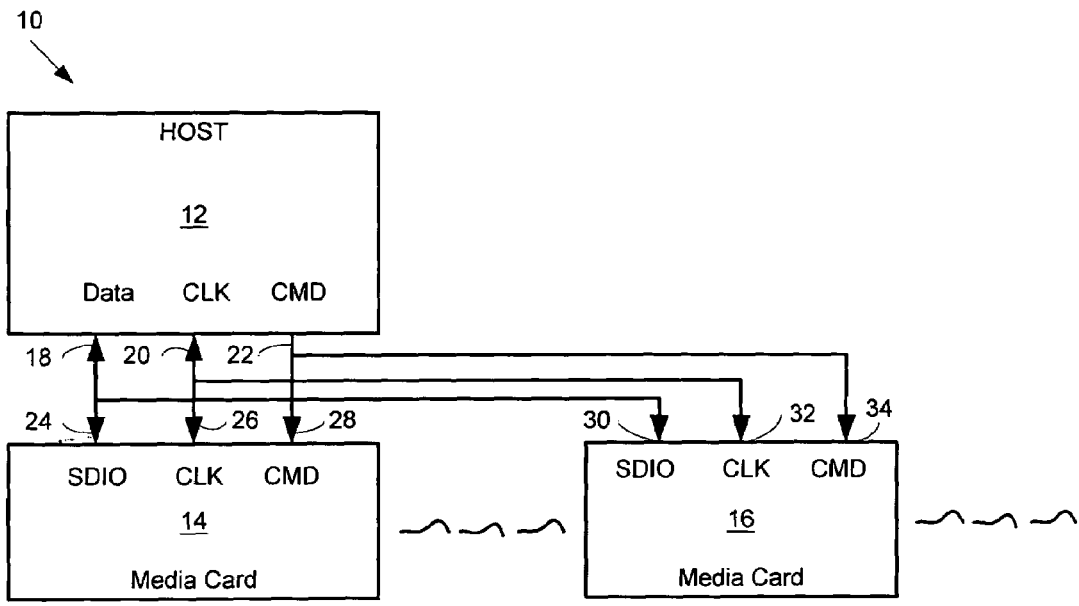
FIG. 1 shows an example of a prior art MMC system 10.
Figure 2:
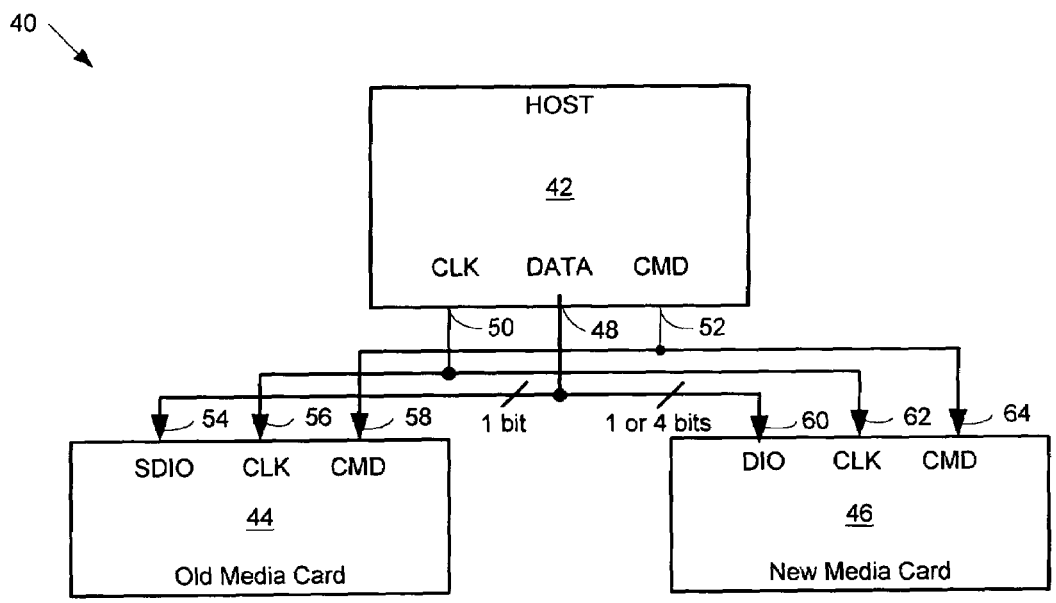
FIG. 2 shows another example of a prior art MMC system 40.
Figure 2A:
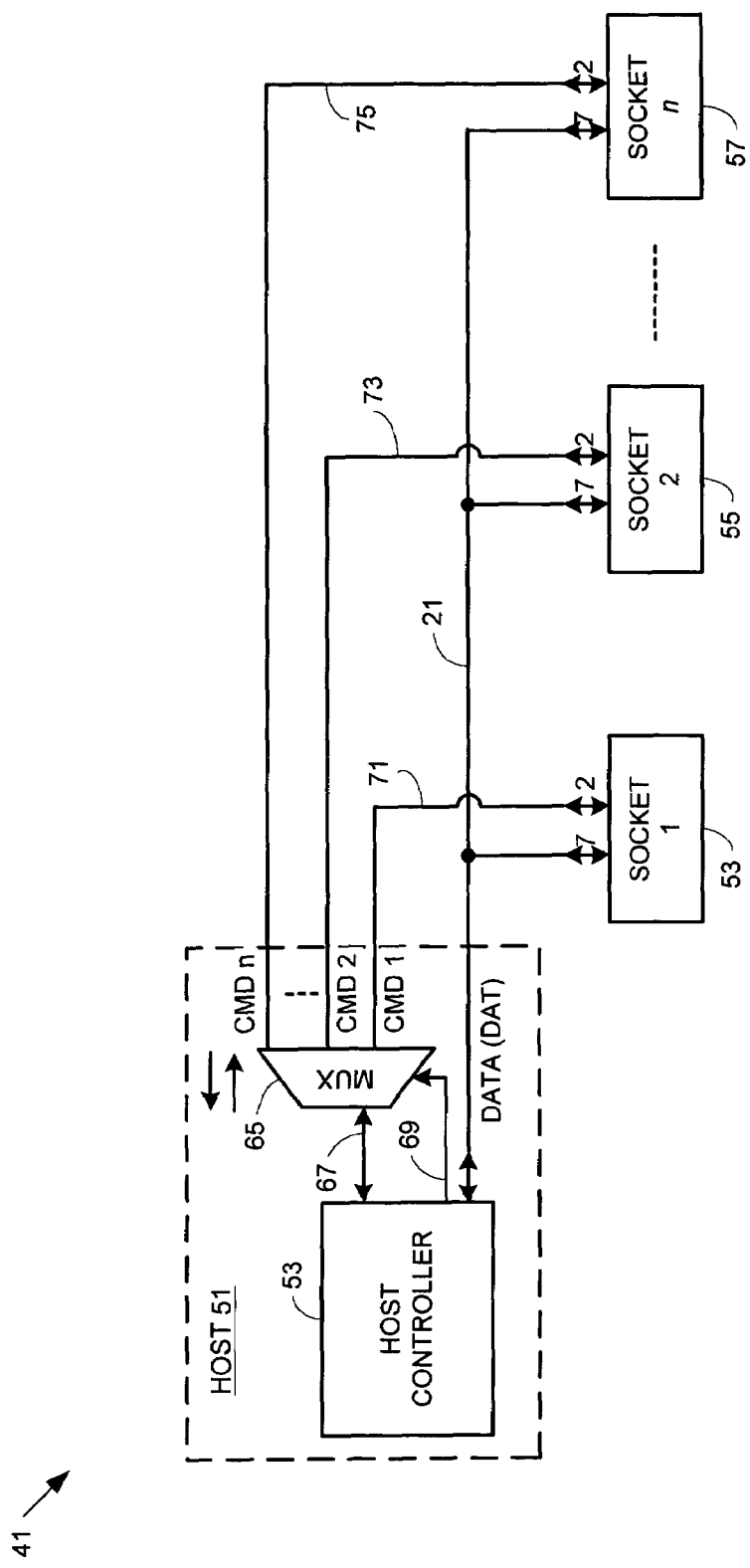
Figure 2B:
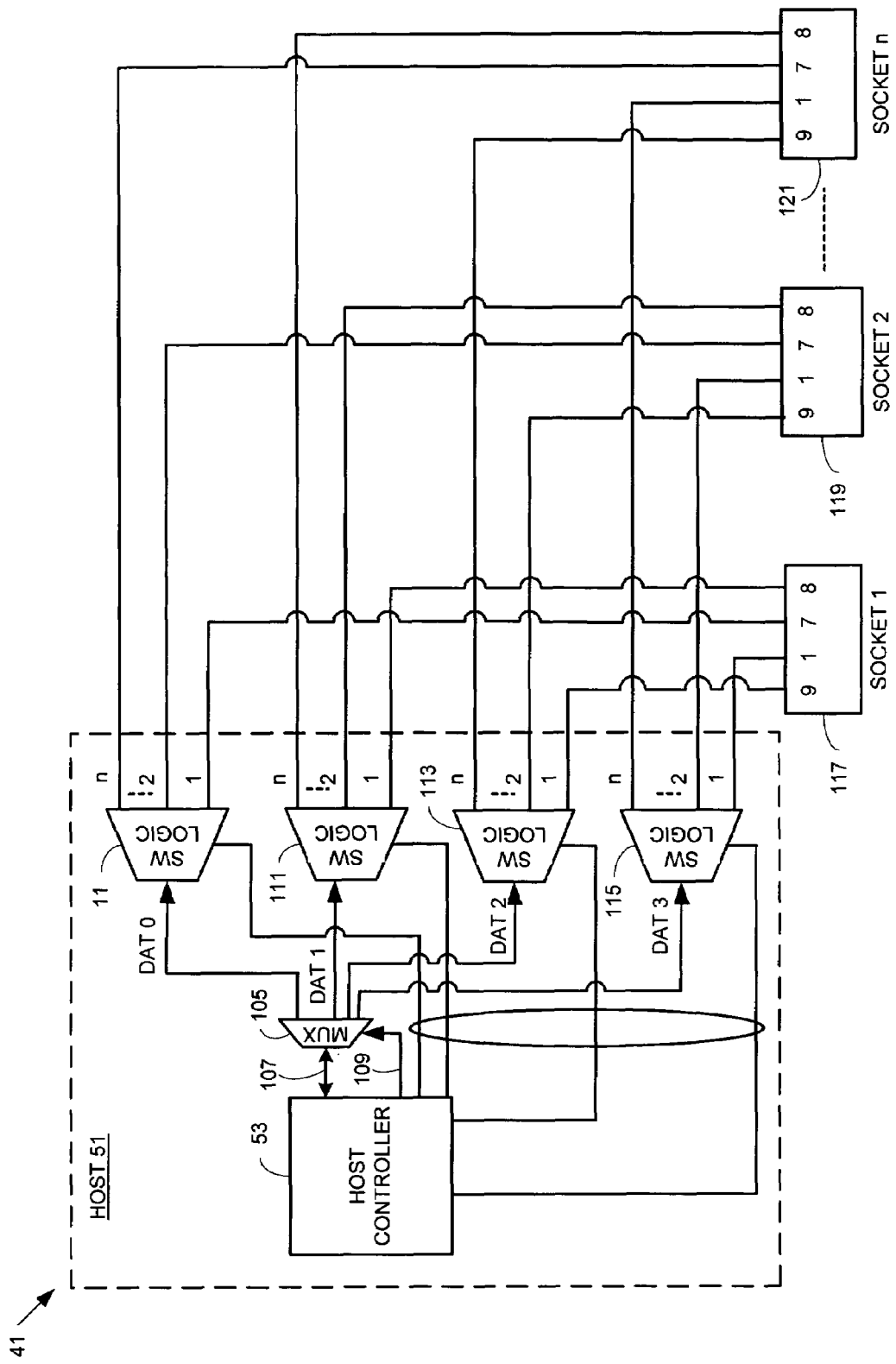

FIGS. 2(a) and 2(b) show yet another example of a prior art system 41.

Figure 3B:
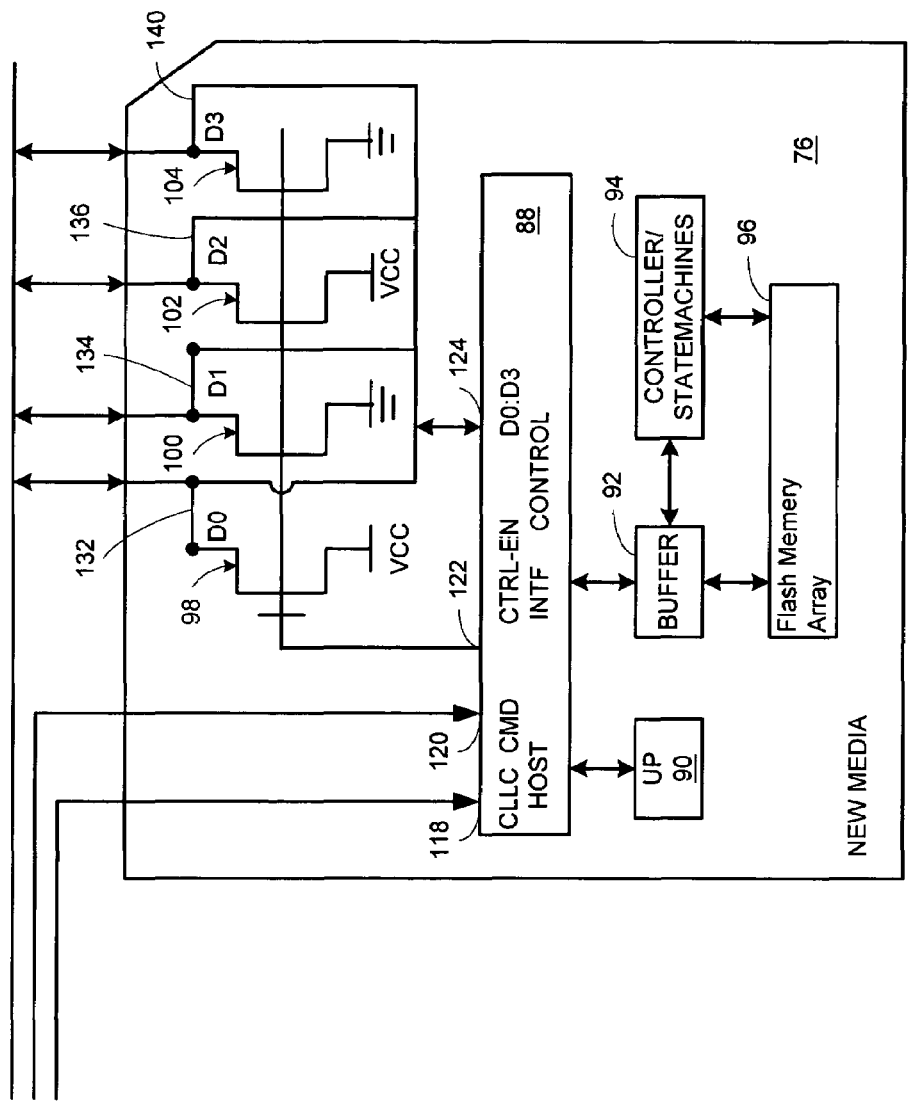

FIG. 3 illustrates an MMC system 70 in accordance with an embodiment of the present invention.

Figure 4B:
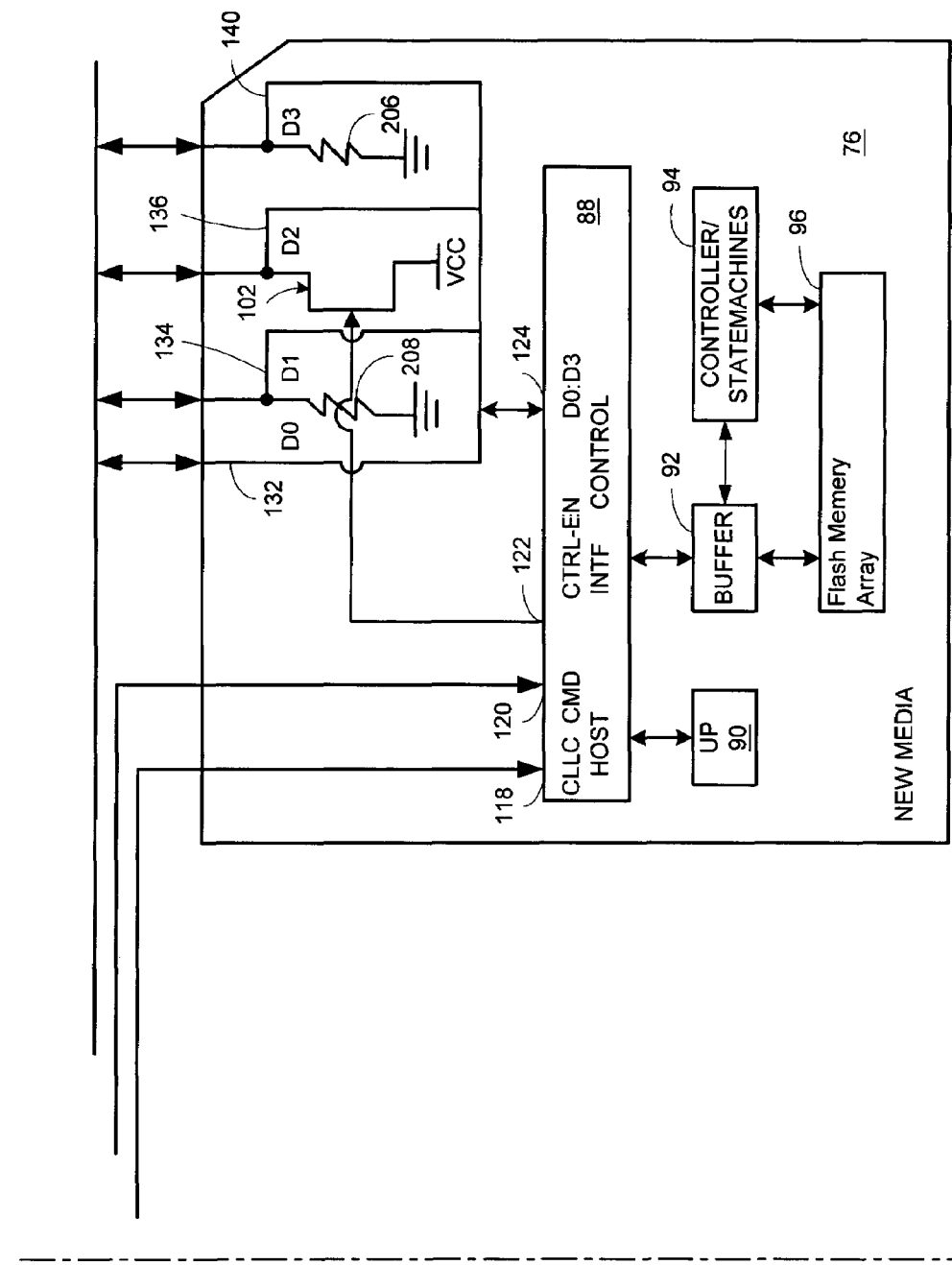

FIG. 4 shows another MMC system 200 in accordance with another embodiment of the present invention.

Figure 5:
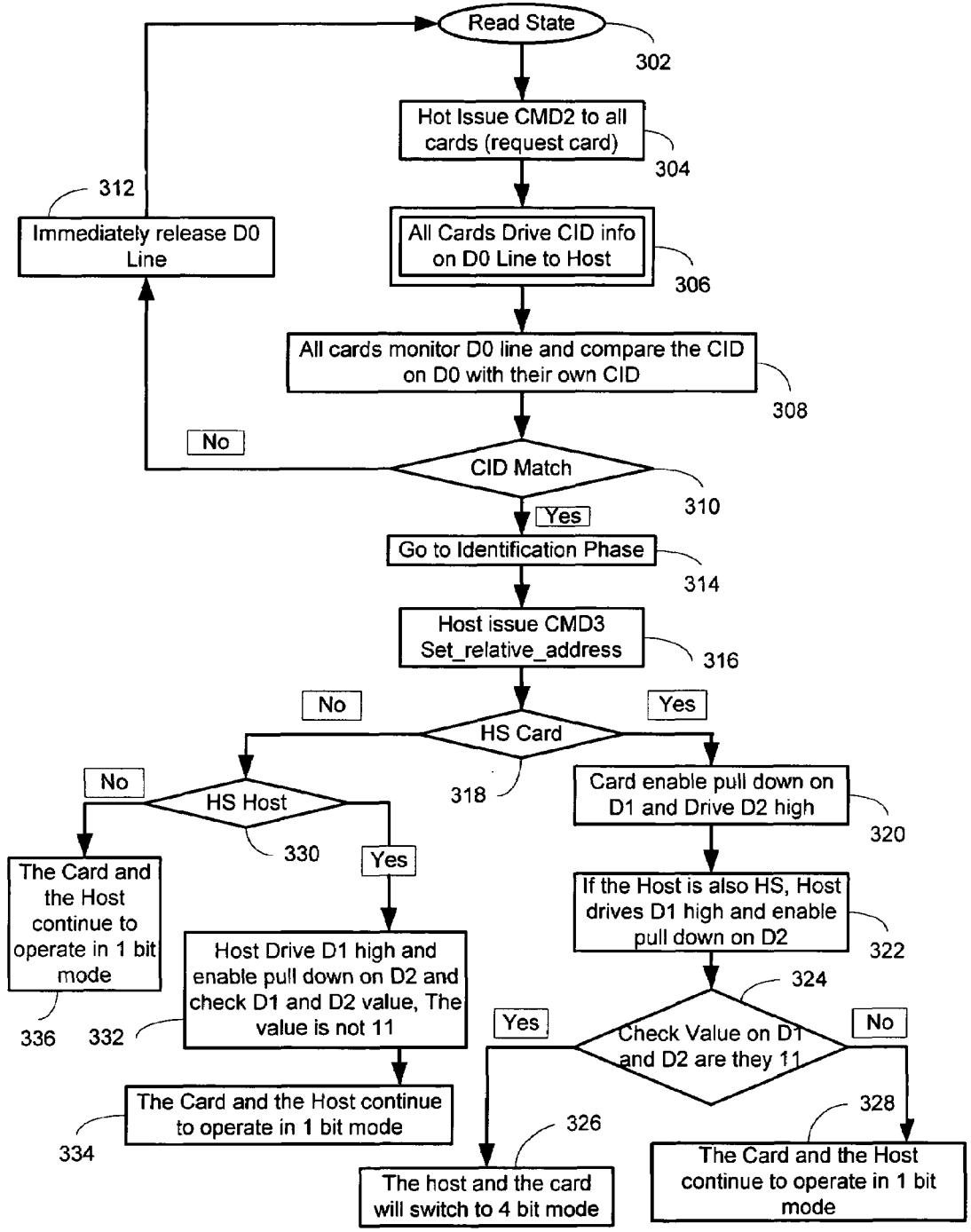

FIG. 5 shows a flow chart 300 describing the steps processed by the systems 70 and 200 of FIG. 4.

DETAILED DESCRIPTION OF THE PREFERRED EMBODIMENTS

Referring now to FIG. 3, a high-speed MMC system 70 is shown to include a host 72 coupled to an old media card 74 and a new media card 76, in accordance with an embodiment of the present invention.

The host 72 is shown to include a media adapter interface block 78, which includes a clock port 112, a command port 114 and a data port 116. The data port 116 accepts signals on signal lines, which in one embodiment of the present invention include data lines either a one-bit data line or multiple (bit) data lines in parallel allowing for parallel data transfer. In the particular embodiment of FIG. 3, the number of signal lines or data lines to and from the port 116 are shown to be four but in other embodiments a different number of data lines may be employed or a selection of multiple bits may be employed, such as 1 or 4 or 8 bits. Additionally, while two media cards, 74 and 76, are shown in FIG. 3, to be coupled to and communicating with the host 72, any number of cards may be employed with departing from the scope and spirit of the present invention.

The media card 74 is shown to include a microprocessor 80, a host interface control logic 82, a controller/state machine 84 and a flash array 84. Additionally, the media card 74 includes a clock port 106, a command port 108 and a single bit data port 110. The microprocessor is shown connected to the host control logic 82, which is shown connected to the controller/state machine 84, which is, in turn, shown connected to the flash array 86. The clock port 106 receives a clock signal from the host 72 for synchronizing in-coming data. The command port 108 is used to receive commands from and the data port 110 for transferring data, one bit at a time between the host 72 and the media card 74. The media card 74 is labeled "old" so as to indicate that it is similar to that of the media card 44 of FIG. 2.

The three ports, 196–110 are shown coupled to the microprocessor 80, which executes software and in doing so controls the flow of process within the media card 74 and particularly among the various blocks therein. The microprocessor 80 is shown coupled to the host control logic 82 for decoding commands received from the host 72, through the command port 108 and for sending commands therefrom.

The host control logic 82 is shown coupled to controller/state machine 84, which controls the storage and retrieval of data within the flash array 86. The flash array 86 is comprised of flash memory cells that are nonvolatile in nature and that are ultimately used for the storage of data received from the data port 110. As indicated earlier with reference to FIG. 2, data transfer rate between the host 72 and the media card 74 is limited due to, in large part, the one-bit serial data line between the host and the media card 74.

The new media card 76 is shown to include a host interface control logic 88 coupled to a microprocessor 90, a buffer 92 and a controller/state machine 94. The buffer 92 and the controller/state machine 94 are coupled to the flash memory array 96. The media card 76 also includes four transistors, 98, 100, 102, 104, each of which is used for a different data line. Thus, if there were more than four data lines being employed, the number of transistors would increase accordingly or vice versa. Each of the transistors 98–104 includes a source, gate and drain ports, as that known to those skilled in the art. These transistors are N-type transistors, however, other types of transistors may be employed without departing from the scope and spirit of the present invention.

The host interface control 88 is shown to include a clock port 118, a command port 120, a control enable port 122 and a data port 124. The clock port 118 is coupled to the clock port 112 of the host 72. The command port 120 is shown coupled to the command port 114 of the host 72 and the data port 124 is shown coupled to source ports of the transistors 98–104. The gate ports of the transistors 98–104 are coupled to the control enable port 122 of the host interface control logic 88. The drain port of the transistors 98 and 102 are connected to Vcc or the equivalent of a high-level direct current (DC) voltage, such as 5 Volts and the drain gates of the transistors 100 and 104 are connected to ground or a low-level voltage level of substantially 0 Volts.

The source ports of the transistors 98–104 are also shown coupled to the data port 116 of the host 72. In the embodiment of FIG. 3, the data ports of the host 72 and the media card 76 are shown to receive four data lines, i.e. four bits. However, other number of bits or data lines may be employed, as mentioned hereinabove. The data lines connecting the data ports 116 and 124 are also shown coupled to pull-up resistors 130. That is, each of the data lines, D0 132, D1 134, D2 136 and D3 140, is connected to a particular resistor, the other side of which is connected to Vcc or a high-level voltage. It should be understood by those of ordinary skill in the art that the data lines D0, D1, D2 and D3, 132–140, each may be connected to either pull-up or pull-down resistors. In the case of a pull-up resistors, the resistor would be connected on one side to the data line and on the other side to Vcc and in the case of a pull-down resistor, the resistor would be connected on one side to a data line and on the other side to ground. In the case of a pull-up resistor, when the particular data line that is pulled-up is not being driven by a signal, the data line would be at a logic state of '1' and in the case of a pull-down resistor, when the particular data line that is pulled-down is not being driven by a signal, the data line would be at a logic state of '0'.

The data lines are pulled up or set to a known voltage level when they are not being driven or set by the control enable port 122. The control enable port 122 includes four lines, each being connected to one of the gat ports of the transistors 98–104.

Similar to that of the card 74, the host interface control logic 88 of the card 76 is shown coupled to controller/state machine 94, which controls the storage and retrieval of data within the flash array 86. The host control logic 88 receives commands from the host 72 using the ports 118, 120 and 124 to communicate with the ports 112, 114 and 116 of the host 72. The flash array 96 is comprised of flash memory cells that are nonvolatile in nature and that are ultimately used for the storage of data received from the data port 124. Unlike the card 74, data transfer between the host 72 and the card 76 is not limited to a one bit serial transfer, rather the host 72 and the media card 76 transfer data therebetween four bits at a time, in parallel, as will be explained shortly. If a different number of data lines was employed, the data transfer between the host and the card would be accordingly different.

The microprocessor 90, which executes software and in doing so controls the flow of process within the media card 76 and particularly among the various blocks therein. The microprocessor 90 is shown coupled to the host control logic 88 for decoding commands received from the host 72, through the command port 120 and for sending commands therefrom.

The host control logic 88 is shown coupled to controller/state machine 94, which controls the storage and retrieval of data within the flash array 96. The flash array 96 is comprised of flash memory cells that are nonvolatile in nature and that are ultimately used for the storage of data received from the buffer 92. The buffer 92 receives data, sent by the host 72, through the data port 124, and temporarily stores the same for transfer and more permanent storage within the array 96.

In operation, upon initialization of the system 70, the host assumes that all of the media cards coupled thereto, such as the cards 74 and 76 transfer data using one data line, or serially. In fact, all of the cards coupled to the host will set themselves to a one-bit serial transfer mode. However, during initialization, the host 72 sends an application specific command to each of the cards 74 and 76, indicating that the host 72 supports high speed mode using four or eight or even higher number data lines. When the cards 74 and 76 take notice of such a command, they will each automatically switch to high speed mode and drive the data lines with a predetermined value.

That is, in the embodiment of FIG. 3, when the card 76 detects an application specific command, from the host 72, on its port 120, it will automatically drive the four data lines connecting the data port 124 to the data port 116 to a predetermined value, in this example, 5 in hexadecimal notation. It will do so by setting the control enable port lines coming from the port 122 and going to the gate ports of the transistors 98–104 to 'on' or a high voltage level so as to turn the transistors 98–104 'on'. By doing so, the transistor 98 will drive the D0 data line 132 (this is the least significant bit of the four data lines 132–140) to a high voltage level or Vcc because the drain gate of the transistor 98 is connected to Vcc and since the transistor is now 'on', the data line 132 will also be at a Vcc state or '1' in binary notation. When the control enable port 122 turns the transistor 100 'on' by driving the gate port of the transistor 100 to a high voltage level, the transistor 100 will drive the D1 data line, 134 to a low voltage level or ground, or substantially 0 Volts because the drain gate of the transistor 100 is connected to ground. When the gate port of the transistor 102 is set to a high voltage level by the port 122, the transistor 102 will be turned 'on' and the D2 data line, 136, will be at a high voltage level, or Vcc. When the gate port of the transistor 104 is set to a high voltage level, the transistor 104 is turned 'on' and the D3 data line, 140, the most significant bit of the data lines 132–140, is driven to ground for the same reason as stated regarding the transistor 100. Thus, the binary states of the data lines 132–140 will be '0101', which is the value '5' in hexadecimal notation. This value, which can be other than '5' in other embodiments of the present invention, indicates to the host 72 that the card 76 can communicate using four bits at a time and from then on, all communications between the host and the card 76 will be done using 4 bits in parallel. During such communication, the data lines 132–140 are terminated or pulled up, as stated earlier using the resistors 130. The reason for including the resistors 130 is because more than one media card could be driving or controlling the data lines 132–140.

By way of example, if the card 76 supported an eight bit data line, and the host similarly supported eight bit data transfers, the card 76 would drive the 8 data lines to a value of '55', in hexadecimal notation, and the host would, from then on, communicate with the card 76 using 8 bit data transfers. If the card 76 only supported four bit data transfers and the host 72 was capable of supporting either four or eight bit transfers, then the card would respond only in four bit mode and the host, by evaluating the value on the data lines 132–140, would communicate with the card 76 using four bit data transfers.

In the case of the card 74, as it is incapable of supporting higher than one-bit data transfers, it will reject the application specific command sent by the host and will continue to communicate in single data line mode. The host 72 realizes the same, as it will not detect a predetermined hexadecimal value, such as '5' or '55' on the data lines from the card 74. The host 72 sends an application specific command, such as a vendor command, to each media card that is in communication therewith and then the media cards, individually, drive the data lines to a predetermined state (such as the value '5') or enable the bus in this fashion. The host 72, during this period, checks the bus or data lines and decides on the number of data lines that each media card can support. From then onward, the host communicates with each media card accordingly.

In an alternative embodiment of the present invention, different application specific commands are used for different number of data lines being employed. For example, a predetermined command 'AcmdX0' is communicated from the host 72 to the cards 74 and 76, indicating a four-bit parallel data transfer. If this command is rejected by any of the cards, the host will continue to communicate with the card that has rejected this command in a default state, which is a one-bit serial transfer. If however, any of the cards accept the command 'AcmdX0', the host 72 will send another command, such as 'AcmdX1', indicating an eight-bit parallel data transfer to see if the card is capable of conducting communication using an 8-bit data transfer mode. If the card accepts the 'AcmdX1' command, the host 72 and the card will automatically start communication in 8-bit mode.

In the embodiment of FIG. 3, when a 'AcmdX0' is sent by the host 72 to the card 74, it is rejected, thus, communication resumes using a one-bit serial transfer. However, when the same command is sent to the card 76, the command is accepted by the card 76 and the host then sends a 'AcmdX1' command to the card 76, which is then rejected, thus, the host knows to conduct communication in 4 bits with the card 76. The host 72 knows the command is rejected by checking the status of the data lines or bus as described in the foregoing.

In yet another embodiment of the present invention, the host sends a command, indicating that it can support either 4 or 8 bits, to each of the cards 74 and 76. As the data lines 132–140 are normally driven to a high level state or Vcc when not being driven by a media card, each card, in response to the command from the host, drives the number of data lines it can support, thus, the host knows the number of lines being supported by each media card and will from thereon, communicate with each card accordingly. For example, when the card 76 receives the command from the host, it will drive all four lines and the host will then know to communicate with the card 76 using four parallel data lines, whereas, when the card 74 receives the host command, it will only drive one data line, thus, the host will communicate with the card 74 serially or using one data bit.

Thus, in the present invention, automatic detection is performed by the host and the media card for high speed communications therebetween.

Referring now to FIG. 4, another high-speed MMC system 200 is shown in accordance with another embodiment of the present invention. The system 200 includes many of the structures and connections of FIG. 3 with modifications to the host and the new media. In fact, all structures and connections that have the same reference numbers as those shown in FIG. 3 are the same. The host 72' and the new media card 76', however, have been modified as discussed in detail below. Anything not discussed below relative to FIG. 4 remains the same as that of FIG. 3.

In FIG. 4, while the host 72' includes the data port 116, D1 of the data port 116 is shown connected to a transistor 202, which at its source port is connected to Vcc and at its gate port connected to an enable signal.

The D2 of the data port 116 is shown connected to a pull-down resistor 204, which at one end is connected to ground and at another end is connected to the D2 line and is also connected to an enable signal.

In FIG. 3, the new media card 76' while still including the data port 124 is modified in that D0 is no longer connected to a transistor and is rather connected from the port 124 to D0 132'. D1 134' is connected to a resistor 208, which is pull down or to a 0 or ground voltage level on one side and to D1 134' on another side and is also controlled by the port 122. D2 136 is connected to the transistor 102 in the same manner as depicted and discussed with reference to FIG. 3 and D3 140' is connected to a resistor 206, in FIG. 4, as opposed to a transistor, such as shown in FIG. 3. The resistor 206 is a pull-down resistor in that it is connected to D3 140' on one side and to a substantially zero or ground voltage level on another side.

Relative to FIG. 4, in operation, the embodiment of FIG. 4 provides for automatic detection by the host 72' and the media card 76' of high speed communication. The host 72' issues a command, through its port 114, to all of the cards connected thereto, in the example of FIG. 4, these are the cards 74 and 76', requesting each card's unique card identification number (CID). All unidentified cards simultaneously send their CID on their respective D0 data line, in the case of the card 74, this is the D0 110 and in the case of the card 76', this is D0 132', serially while bit wise monitoring their outgoing bit stream. That is, the cards also monitor the D0 line at the same time. The D0 line is open drain such that if the D0 line is not driven, it remains at a high or '1' value but if another device drives the D0 line, then obviously, it can take on a low or '0' value depending on the device driving it. In the case of the latter, the D0 line would remove itself from the process until the next phase.

Those cards whose outgoing CIDs do not match corresponding bits on the command ports 108 and 120, in any one of the bit periods, remove themselves from the data bus line (the D0–3 data lines) and go to a 'ready' state. In this case, the card which is successful in matching the contents riding on its D0 line with the command line, is ready to go to an identification state where the host 72' issues a CMD3 (or set_relative_addr) to assign to the card a relative card address (RCA) by sending the data serially to the card through the D0 port.

At this time, some D1 and D2 lines are not active. The host which supports high speed communication, drives its D1 line high by enabling the transistor 202 and enabling the pull-down resistor 204.

During the CMD3 command, the media, which supports high speed mode, also enables the transistor 102 on the D1 line and the pull-down resistor on the D1 line 134. At this time, the host 72' and the media card 76' monitor the D1 and the D2 data lines for the state in which they are. That is, if the D1 and the D2 lines are both high, the host 72' automatically senses that the card, for example the card 76', is capable of supporting or operating at higher speeds through multiple data bit transfers as opposed to serial data transfers. In the latter case, the host 72' changes mode to high speed. The card 76' then detects or senses a high value or state on the D1 and the D2 data lines at 134' and 136, respectively. Thus, the card 76' switches to high speed mode. If however, the value on either the D1 or D2 lines are not detected as being at a high state, the card 76' and the host 72' continue to operate in a one-bit or serial mode.

For devices or media cards, such as the card 76', that support more than four bits, such as 8 bits, the upper bits of the data line, i.e. the four most significant bits, are decoded to select between a one or four or eight bit or even higher number of bits operation. For higher data rates, this method enables the host and the media card to automatically select the right mode. Also, obviously, use of higher number of data lines, in parallel, causes faster data transfers and thus higher system performance.

It should be noted that the embodiments of FIGS. 3 and 4 and the present invention, in general, enable the host and the media card(s), coupled thereto, to select and/or operate in any mode of operation, such as one, four, eight or any other number of data lines or bits coupled between the host and the media cards. Clearly, the more the number of parallel data lines employed, the faster the overall system operation. Additionally, the present invention may be employed in a wide variety of applications, such as MMC interfaces, as described hereinabove, or USB modes or any other type of application perceived by those of ordinary skill in the art.

Referring now to FIG. 5, a flow chart 300 is shown to describe the steps processed by the systems 70 and 200 of FIGS. 3 and 4, respectively. In default state, all media cards are in 'ready' state. At step 302, a read operation is initiated. Next, at step 304, the host issues a "CMD2" command to all of the media cards in communication therewith. Next, at step 306, all of the media cards drive CID information onto the D0 line, to the host. Next, at step 308, all of the media cards monitor the D0 line and compare the CID on the D0 line with their own CID. Next, at step 310, a determination is made as to whether or not a match is made between the CID that appears on the D0 line and the media cards' own CID.

If, at 310, it is determined that a match is made, the process continues to step 314 at which time, the process enters an identification phase. If at step 310, it is determined that a match is not made, the process goes onto step 312 where the D0 line is released immediately (no longer driven).

After step 314, at step 316, the host issues a "CMD3" command or a 'set_relative address' command. Next, at 318, a determination is made as to whether or not any of the media cards in communication with the host is a high speed card. At step 318, if at least one media card is a high speed card, that particular high speed media card then enables the pull-down resistor on the D1 line and drives the D2 line high at step 320. Next, at step 322, if the host is also operating at high speed, the host drives the D1 line high and enables the pull-down resistor on the D2 line. Next, at step 324, a determination is made as to whether or not the value on the D1 and the D2 lines are a predetermined value, such as '11' or both high. If so, at step 326, the host and the high speed media card switch to a four-bit mode and operate accordingly from hereon. If however, at 324, it is determined that the value on the D1 and D2 lines is not '11', the process goes to step 328 where the media card is noted to be a high speed card, at step 318, and the host continue to operate in one-bit mode. It should be noted that at step 302, or initially, the host and the media cards operate in one-bit mode.

If at step 318, no high speed media cards are present, the process continues to step 330, where a determination is made as to whether or not the host is a high speed host and if so, at step 332, the host drives the D1 line high and enables the pull-down resistor on the D2 line and checks the value on the D1 and the D2 lines. This value will not be '11', thus, at step 334, the card and the host continue to operate in a one-bit mode. If at step 330, it is determined that the host does not operate at high speed, the process goes on to step 336, at which time, the media card(s) and the host continue to operate in one-bit mode.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A high speed multi-media card system for automatic detection of high speed communication comprising:
    a host; and
    one or more media cards, coupled to the host through a one or more of data lines, at least one of which is a serial data line, said one or more media cards each having a unique card identification number (CID) associated therewith and responsive to a first command from the host requesting each card's unique CID and responsive thereto, said one or more media cards sending their respective CID, through the serial data line, to the host and if the sent CID matches that which is expected from the host, the host transmitting a second command assigning a relative card address (RCA) to the card whose CID made the match, and said one or more media cards driving a predetermined value on all or a portion of the one or more data lines and said host automatically sensing said predetermined value which is indicative of operation at high speeds by the cards which have driven said predetermined value on the data lines, said host communicating in high speed mode with the cards which have driven the predetermined value on the data lines.

2. A high speed multi-media card system as recited in claim 1 wherein said one or more media cards includes a particular media card including data ports connected to the one or more of data lines, said data ports connected to transistors for driving the data lines to a predetermined value when enabled by the particular media card.

3. A high speed multi-media card system as recited in claim 2 wherein the one or more of data lines are coupled to pull-up resistors.

4. A high speed multi-media card system as recited in claim 1 wherein said particular media card is a high speed media card.

5. A high speed multi-media card system as recited in claim 1 wherein said one or more media cards includes a particular media card including data ports connected to the one or more of data lines, a subset of said one or more of data ports coupled to resistors for driving the data lines connected thereto to a first predetermined value and another subset of said one or more of data ports coupled to transistors for driving the data lines connected thereto to a second predetermined value.

6. A high speed multi-media card system as recited in claim 5 wherein said particular media card is a high speed card.

7. A high speed multi-media card system as recited in claim 5 wherein said host includes a one or more of data ports coupled to said one or more of data lines, at least one of said host data ports coupled to a host transistor.

8. A high speed multi-media card system as recited in claim 5 wherein one of the one or more media cards continues to communicate with the host serially through the serial data line.

9. A high speed multi-media card system for automatic detection of high speed communication comprising:
   a host;
   one or more media cards, coupled to the host through a one or more of data lines, at least one of which is a serial data line, said host for sending a first command to the cards indicating its capability to support multi-bit communication, said cards, in response to the first command, driving the number of data lines that they can support indicative of the number of bits of the data lines they can use to communicate with the host, thereafter, the host automatically communicating with the media cards using the number of data lines driven by the latter.

10. A high speed multi-media card system as recited in claim 9 wherein at least one of the media cards is a high speed media card.

11. A high speed multi-media card system as recited in claim 9 wherein said one or more media cards includes a particular media card including data ports connected to the one or more of data lines, a subset of said one or more of data ports coupled to resistors for driving the data lines connected thereto to a first predetermined value and another subset of said one or more of data ports coupled to transistors for driving the data lines connected thereto to a second predetermined value.

12. A high speed multi-media card system as recited in claim 11 wherein said host includes a one or more of data ports coupled to said one or more of data lines, at least one of said host data ports coupled to a host transistor.

13. A high speed multi-media card system as recited in claim 11 wherein one of the one or more media cards continues to communicate with the host serially through the serial data line.

14. A method for automatic detection of high speed communication used in high speed multi-media card systems comprising:
   receiving a first command from a host, through a one or more of data lines, requesting unique card identification numbers (CID) from one or more media cards coupled to the host;
   responsive to said first command, sending respective CIDs, through the serial data line, to the host;
   if one of the sent CIDs matches that which is expected from the host, the host transmitting a second command assigning a relative card address (RCA) to the card whose CID made the match;
   driving a predetermined value on all or a portion of the one or more of data lines;
   automatically sensing said predetermined value which is indicative of operation at high speeds by the cards which have driven said predetermined value on the data lines; and
   communicating, in high speed mode, with the cards which have driven the predetermined value on the data lines.

15. A method for automatic detection as recited in claim 14 wherein if none of the sent CIDs match that which is expected from the host, the one or more media cards remaining in a 'ready' state.

16. A high speed multi-media card system for automatic detection of high speed communication comprising:
   a host;
   one or more media cards, coupled to the host through one or more signal lines, at least one of which is a data line, said host and the one or more media cards communicating with each other using a first mode of communication, said host for sending command or data to the cards, using said first mode of communication and at a predetermined period of time, the host and/or one of the one or more media cards driving a value on the one or more signal lines, wherein when the host or the one or more media cards senses said value, a second mode of communication is switched thereto.

17. A high speed multi-media card system as recited in claim 16 wherein said first mode of communication is serial and said second mode of communication is multi-bit.

18. A high speed multi-media card system as recited in claim 16 wherein in the second mode of communication, four, eight or higher number of data lines is employed.

19. A method for automatic detection of high speed communication employed in high speed multi-media card systems comprising:
   communicating using a first mode of communication between a host and one or more media cards through one or more signal lines;
   sending command or data to the cards, using said first mode of communication;
   at a predetermined period of time, the host and/or one of the one or more media cards driving a value on the one or more signal lines;
   when the host or the one or more media cards senses said value, switching to a second mode of communication.

20. A high speed multi-media card system for automatic detection of high speed communication comprising:
   a host;
   one or more media cards, coupled to the host through a plurality of signal lines, at least one of which is a data line, said host and the one or more media cards communicating with each other using a first mode of communication, automatically switching to a second mode of communication when the host or the one or more media cards detects a predetermined value on the signal lines indicative of the host and/or one of the one or more media cards having driven said predetermined value on the one or more signal lines.

21. A high speed multi-media card system for automatic detection of high speed communication comprising:
   a host; and
   one or more media cards, coupled to the host through a plurality of data lines, at least one of which is a serial data line, said one or more media cards each having a unique card identification number (CID) associated therewith and responsive to a first command from the host requesting each card's unique CID and responsive thereto, said one or more media cards sending their respective CID, through the serial data line, to the host and if the sent CID matches that which is expected from the host, the host transmitting a second command assigning a relative card address (RCA) to the card whose CID made the match, and said one or more media cards driving a predetermined value on all or a portion of the plurality of data lines and said host automatically sensing said predetermined value which is indicative of operation at high speeds by the cards which have driven said predetermined value on the data lines, said host communicating in high speed mode with the cards which have driven the predetermined value on the data lines.

22. A high speed multi-media card system as recited in claim 21 wherein said one or more media cards includes a particular media card including data ports connected to the plurality of data lines, said data ports connected to transistors for driving the data lines to a predetermined value when enabled by the particular media card.

23. A high speed multi-media card system as recited in claim 22 wherein the plurality of data lines are coupled to pull-up resistors.

24. A high speed multi-media card system as recited in claim 22 wherein said particular media card is a high speed media card.

25. A high speed multi-media card system as recited in claim 22 wherein said one or more media cards includes a particular media card including data ports connected to the plurality of data lines, a subset of said one or more of data ports coupled to resistors for driving the data lines connected thereto to a first predetermined value and another subset of said one or more of data ports coupled to transistors for driving the data lines connected thereto to a second predetermined value.

26. A high speed multi-media card system as recited in claim 25 wherein said particular media card is a high speed card.

27. A high speed multi-media card system as recited in claim 25 wherein said host includes a one or more of data ports coupled to said plurality of data lines, at least one of said host data ports coupled to a host transistor.

28. A high speed multi-media card system as recited in claim 25 wherein one of the one or more media cards continues to communicate with the host serially through the serial data line.

29. A high speed multi-media card system for automatic detection of high speed communication comprising:
a host;
one or more media cards, coupled to the host through a plurality of data lines, at least one of which is a serial data line, said host for sending a first command to the cards indicating its capability to support multi-bit communication, said cards, in response to the first command, driving the number of data lines that they can support indicative of the number of bits of the data lines they can use to communicate with the host, thereafter, the host automatically communicating with the media cards using the number of data lines driven by the latter.

30. A high speed multi-media card system as recited in claim 29 wherein at least one of the media cards is a high speed media card.

31. A high speed multi-media card system as recited in claim 30 wherein said one or more media cards includes a particular media card including data ports connected to the plurality of data lines, a subset of said one or more of data ports coupled to resistors for driving the data lines connected thereto to a first predetermined value and another subset of said one or more of data ports coupled to transistors for driving the data lines connected thereto to a second predetermined value.

32. A high speed multi-media card system as recited in claim 31 wherein said host includes a one or more of data ports coupled to said one or more of data lines, at least one of said host data ports coupled to a host transistor.

33. A high speed multi-media card system as recited in claim 31 wherein one of the one or more media cards continues to communicate with the host serially through the serial data line.

* * * * *